(No Model.)

F. J. ROST.
BAKER.

No. 427,797. Patented May 13, 1890.

Witnesses
H. D. Nealy.
P. W. Fowler.

Inventor
Franz J. Rost,
by A. H. Evans & Co.
Attorneys

UNITED STATES PATENT OFFICE.

FRANZ JULIUS ROST, OF MILWAUKEE, WISCONSIN.

BAKER.

SPECIFICATION forming part of Letters Patent No. 427,797, dated May 13, 1890.

Application filed June 7, 1889. Serial No. 313,515. (No model.)

*To all whom it may concern:*

Be it known that I, FRANZ JULIUS ROST, a citizen of the United States, residing at Milwaukee, in the county of Milwaukee and State of Wisconsin, have invented certain new and useful Improvements in Bakers; and I do hereby declare the following to be a full, clear, and exact description of the invention, such as will enable others skilled in the art to which it appertains to make and use the same.

Figure 1:
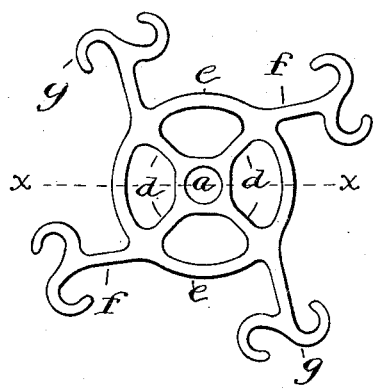
Figure 2:
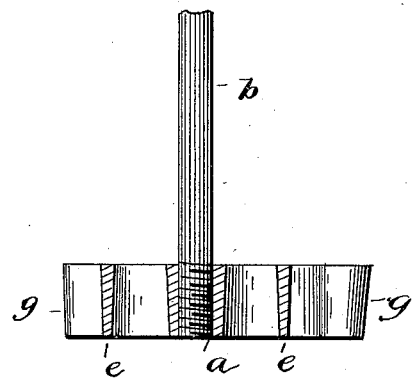
Figure 3:
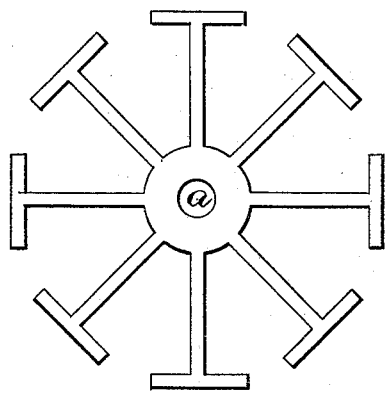
Figure 4:
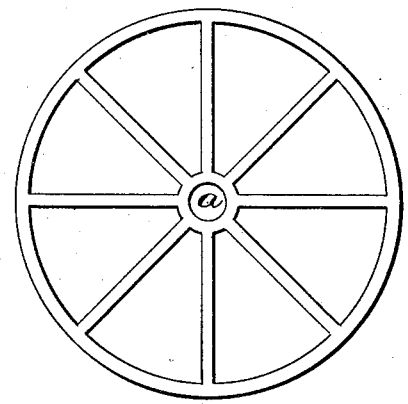

Figure 1 represents a plan view of one form of a baking utensil when constructed according to my invention. Fig. 2 is a sectional view on the line $x\ x$ of Fig. 1. Figs. 3 and 4 illustrate modified forms of the same.

My invention relates to devices for baking cakes of fanciful designs or shapes; and it consists in the improved device which I shall hereinafter fully describe and claim.

In the drawings, Fig. 1, A represents one form of baking utensil, which, because of its cheapness, I prefer to construct of cast-iron, although other material will answer equally as well. The device illustrated in said figure has a central hub $a$, provided with a threaded opening for the reception of a suitable handle $b$, and concentric with the hub portion and united thereto by the radial arms $d$ is a ring $e$, from the outer periphery of which project tangentially other arms $f$, whose outer ends are formed with S-shaped portions $g$, although any other designs may be employed, if desired. The walls of the entire device, including the hub, concentric ring, arms, &c., are tapered from the top toward the bottom, as shown in Fig. 2, the thinnest portion being at the bottom, whereby the cake when baked is readily removed from the iron without destroying its shape.

In using my invention the handle is screwed into the threaded socket in the hub and the device dipped into hot lard or butter and then into the pan or vessel which contains the batter or material to be baked, which will adhere to the walls of the device. The device is now placed in hot lard or butter and the cake baked to the desired color, when the device is removed from the lard or butter. The cake may now be readily removed from the beveled walls of the device, and when so removed is a fac-simile of the device, of attractive appearance and pleasing to the appetite.

I do not limit myself to the exact form or design of device shown in Fig. 1, as any desired shape may be used without departing from the spirit of my invention.

In Figs. 3 and 4 I illustrate other designs of baking-iron; but in these cases and all others the devices will have the tapered wall to facilitate the removal of the cake after it has been baked.

Having thus described my invention, what I claim as new, and desire to secure by Letters Patent, is—

1. A baking device consisting of a horizontal body portion whose walls taper from the top toward the bottom and are adapted to be dipped into the batter, which thereby adheres to its inner and outer sides, and a handle removably fitted to said body portion, substantially as described.

2. A baking utensil or device having a threaded socket and a handle fitted thereto, said device consisting of concentric circles or rings and radial arms, the walls of which taper from the upper to the lower portions, substantially as described.

In testimony whereof I affix my signature in presence of two witnesses.

FRANZ JULIUS ROST.

Witnesses:
WM. WALTHERS,
KATE WALTHERS.